Feb. 15, 1949.　　　　J. H. STARK, JR　　　2,461,577
COLLAPSIBLE TRAILER
Filed Feb. 6, 1945　　　　　　　　　　　5 Sheets-Sheet 1
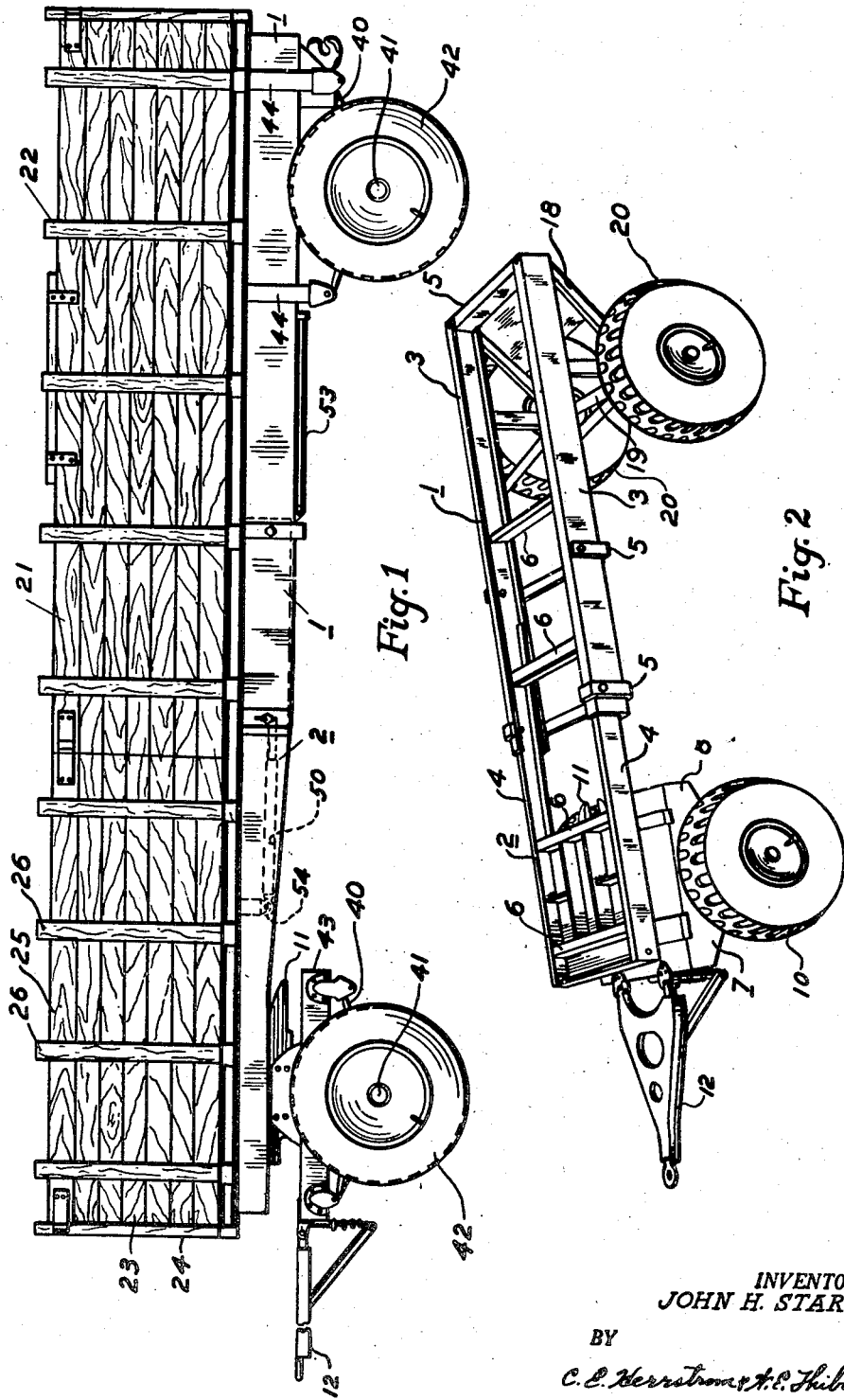
INVENTOR.
JOHN H. STARK, JR.
BY
ORNEYS Feb. 15, 1949. J. H. STARK, JR 2,461,577
COLLAPSIBLE TRAILER
Filed Feb. 6, 1945 5 Sheets-Sheet 2

INVENTOR.
JOHN H. STARK, JR.
BY
ATTORNEYS

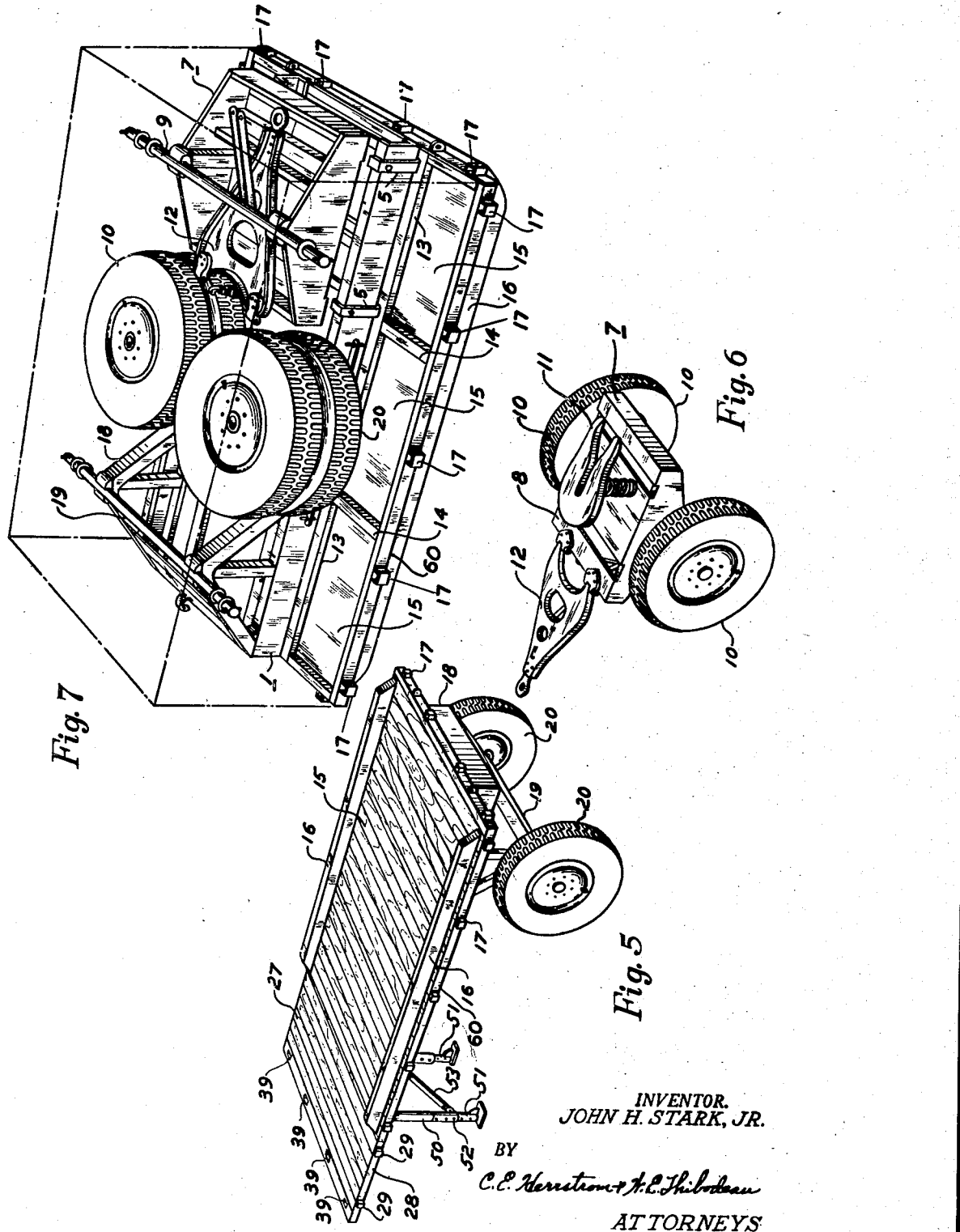

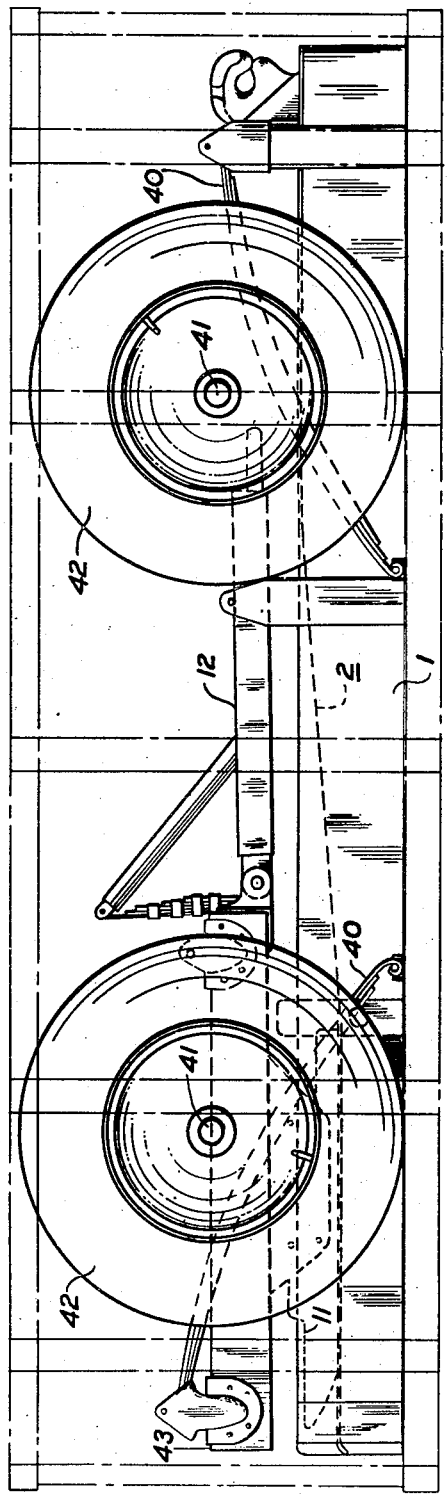

Feb. 15, 1949.  J. H. STARK, JR  2,461,577
COLLAPSIBLE TRAILER

Filed Feb. 6, 1945  5 Sheets-Sheet 5

INVENTOR.
JOHN H. STARK, JR.
BY

ATTORNEYS

Patented Feb. 15, 1949

2,461,577

UNITED STATES PATENT OFFICE 2,461,577

COLLAPSIBLE TRAILER

John H. Stark, Jr., Springfield, Ohio

Application February 6, 1945, Serial No. 576,438

5 Claims. (Cl. 296—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to vehicle trailers, and it relates more particularly to an expansible and collapsible trailer.

All devices of this character, made according to the teachings of the prior art, and with which I am familiar, have required considerable cubage in packaging for shipment. Other trailers have provided no suitable means for expanding the length of the trailer to accommodate bulky loads. No trailer has been heretofore provided which could be packaged in a crate with a minimum cubage utilizing the structural members of the trailer entirely.

It is, accordingly, an object of my invention to overcome the above and other defects in present day trailers, and it is more particularly an object of my invention to provide a vehicle trailer which is simple in construction, efficient in operation, economical in cost, and which requires a minimum of maintenance.

Another object of my invention is to provide a collapsible vehicle trailer which may be used as a semi-trailer or a full four wheel trailer.

Another object of my invention is to provide a vehicle trailer which may be packaged in a buoyant crate of minimum cubage utilizing the structural elements of the trailer itself.

Another object of my invention is to provide a vehicle trailer which may be readily lowered from a ship into the water and floated to shore.

Another object of my invention is to provide a vehicle trailer, the front and rear wheeled axle portions of which may be separated and connected to a long body such as a bomber body for transportation thereof over land.

Another object of my invention is to provide a vehicle trailer which is adapted to have a platform body or a stake rack body.

Another object of my invention is to provide a trailer which may be expanded lengthwise.

Other objects of my invention will become evident from the following detailed description, taken in conjunction with the accompanying drawings, in which:

Figure 1 is a side elevational view of my novel vehicle trailer fully expanded;

Figure 2 is a perspective view of my novel vehicle trailer without a body;

Figure 5 is a perspective view of my novel trailer with the front dolly removed;

Figure 6 is a perspective view of the front subframe or dolly of my novel trailer;

Figure 7 is a perspective view showing the different elements of my novel trailer in a position to be packaged;

Figure 8 is a side elevational view of a different arrangement of elements in a crate;

Figure 3:
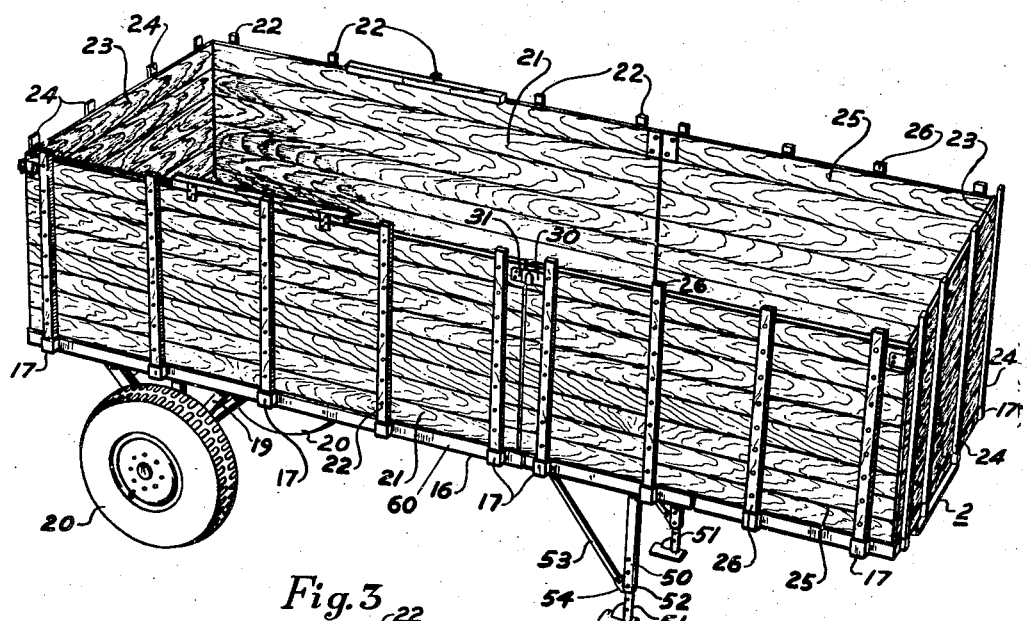
Figure 3 is a perspective view of my novel vehicle trailer in expanded position with the front dolly removed.
Figure 4:
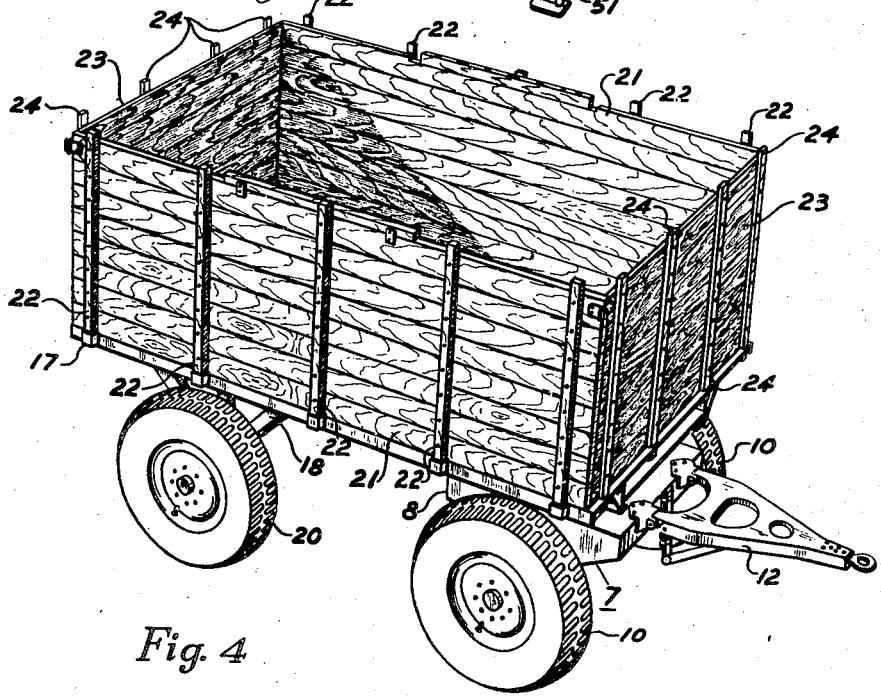
Figure 4 is a perspective view showing my novel trailer in its shortest position.

Referring now to the drawings, Figure 2 shows a channel-shaped main frame I open at the front end thereof for telescopically receiving a slidable frame 2. The frames I and 2 are made of channel members 3 and 4 although any other suitable forms may be used. Transverse members 5 brace the frame I while transverse members 6 brace the frame 2. The slidable frame 2 has connected integral therewith a so-called upper fifth wheel or plate bearing (not shown) for engaging the plate bearing II on a dolly 7 shown in Figure 6. Dolly 7 is of conventional design comprising a sub-frame 8, axle 9 and wheels 10. The plate bearing II is adapted to be pivotally and detachably joined with the upper plate bearing by a king pin (not shown). A suitable drawbar 12 is pivotally attached to the forward end of the dolly 7 and extends forwardly therefrom.

Alined sills 13 (Figure 7) along with transverse members 14 are disposed on the main frame I and carry floor sections 15. Sill members 16 are attached on the sides of the floor sections 15 and serve as skid members of a crate when inverted. An iron strap 60 is marginally disposed around the floor sections 15 and has spaced sockets 17 formed on the outer sides thereof. A rear subframe 18 with axle 19 and wheels 20 support the rear portion of the frame I.

Side panels 21 with spaced stakes 22 and end panels 23 with spaced stakes 24 are disposed around the floor 15 with the stakes 22 and 24 engaging the sockets 17. When the trailer is in an extended position as shown in Figure 3, additional side panels 25 with stakes 26 and a sectional floor extension 27 are provided if desired. Iron straps 28 with sockets 29 are marginally disposed on each side of the floor extension 27 for receiving the stakes 26 on the side panels 25. Sockets 39 receive the ends of the stakes 24 on end panel 23. Hook and eye members 30 and 31 are utilized to quickly attach and detach the side and end panels 21, 23 and 25.

Side panels 21 are provided for each side and carry stakes 22 adapted for insertion in the socket members 17.

The frame section 2 carries apertured pivotally mounted telescopically disposed leg members 50 and 51 adapted to receive a cross pin 52 for adjusting and securing lengthwise the leg members 50 and 51 at any predetermined length. For each leg there is provided a brace 53 adapted to be pivotally attached to the leg 52 at 54 and to the frame 2. Figure 1 shows the brace 53 carried under the frame 1. The leg members 50 and 51 when not in use, are swung upwardly and are suitably secured to the frame 2 as shown in dotted lines in Figure 1.

Figure 9:
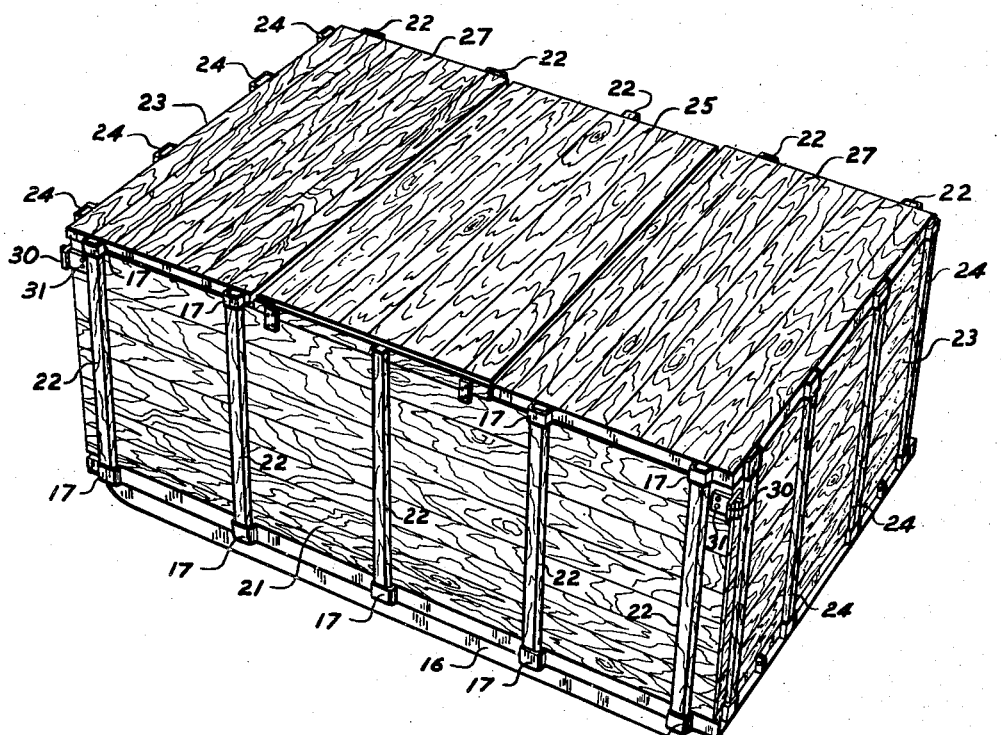
Figure 9 is a perspective view of a boxed unit.

When it is desired to package the vehicle shown in Figures 2, 3, 4, 5, 6 and 7, the floor extension 27 and panels 23 and 25 from the extended forward frame 2 are removed, and the forward frame 2 pushed rearwardly into the main frame 1 to its limit as shown in Figure 7. Dolly 7 is swung through 180 degrees so that the drawbar 12 lies beneath the vehicle. The panels 21 and 23 are removed from the main frame 1; wheels 10 and 20 are removed and the vehicle is inverted for packaging as in Figure 7. The panels 21 are so constructed that the stakes 22 thereon may be inserted in sockets 17 from either side. The sections of the floor extension 27 are used as a cover with the intermediate section being one of the side panels 25. After making provision for forming and enclosing the crate, there remain two side panels and one floor section from the floor extension 27. These may be laid upon the axles. The cover is then assembled as described and fastened by any suitable means (not shown). The enclosed package shown in Figure 9 has buoyancy in water.

The slidable frame 2 may be extended as in Figure 5 or as in Figures 1 and 3. It may be utilized as a semi-trailer.

Figure 1 shows a vehicle identical with that heretofore described except for the provision of springs 40. The bottom of the sub-frame 43 is slightly modified to provide for attaching springs 40. No sub-frame is necessary on the rear. Brackets 44 are provided for attaching the springs 40. Axles 41 with wheels 42 are attached to springs 40 to provide suspension for the frames 1 and 2.

Figure 8 shows the method of boxing the unit shown in Figure 1. The springs 40 are detached at one end to lower the inverted wheels 41 to the floor. The purpose of lowering the wheels 41 in Figure 8 is to bring the wheels 42 entirely below the upper edges of the enclosing panels. It will be evident that this unit may be boxed in the same manner as has been heretofore described and in the same cube box, with the exception that the wheels are not removed.

It will be evident from the foregoing that I have provided a novel vehicle trailer which is efficient in operation, which may be extended at least one and a half times its original length, which may have many different body types, which may be packaged by use of its own structural elements, and which is buoyant in water.

Various changes may be made in the specific embodiment of my invention without departing from the spirit thereof, or from the scope of the appended claims.

What I claim is:

1. A vehicle trailer collapsible into a complete self-contained crate for packaging comprising, in combination, a frame, wheeled means supporting said frame, a floor carried by said frame, sill members rigidly secured on said floor and parallel to side edges thereof, side and end panels disposed about said floor, and separable means securing said floor and panels together to form a vehicle body, said floor with said sill members thereon being invertible to form respectively a base and external skids thereon of said crate, said panels being securable by said separable means to said base to form therewith closure members of said crate for packaging therein remaining portions of said trailer.

2. A vehicle trailer collapsible into a self-contained crate for packaging comprising, in combination, a first frame portion, a second frame portion telescopically connected with said first frame portion, wheeled means attached to said frame portions for supporting the same, a floor carried by said first frame portion, floor sections carried by said second frame portion, sill members rigidly secured parallel to and spaced from the side edges of said floor, socket members attached to said floor and floor sections, and detachable panels having stake members fitting into said socket members and forming the sides and the ends of the vehicle trailer, said floor with said sill members secured thereto being invertible for packaging to form respectively the base and skid members of a self-contained crate, said socket members on said floor being invertible with the latter for packaging to receive the stake members of said panels to thereby form with said panels the sides and the ends of the self-contained crate, said floor sections and remaining panels being securable for packaging to said crate to form a closure for the latter.

3. A buoyant expansible vehicle trailer collapsible for packaging into a crate formed of its own structural elements comprising, in combination, a channel shaped main frame, a second channel shaped frame movable relative to and lengthwise of said main frame, wheeled axles for supporting said frames, a floor attached to said main frame, space socket members disposed around said floor on the outer sides thereof, side and end panel members disposed around said floor, stake members on and extending outwardly from said side and end panel members removably disposable in said socket members, and a floor member with additional side and end panel and stake members respectively disposable on said second frame when the latter is in an extended position, said floor with said socket member thereon being invertible for packaging to receive said stake members and to thereby form with said side and end panel members part of a buoyant crate, said floor member and said additional stake, socket, and side and end panel members being securable to said part to complete said crate for packaging, all of the remaining elements of said trailer being enclosable in said crate for packaging.

4. A buoyant, expansible vehicle trailer as set forth in claim 3 wherein sill members are secured to said floor, said sill members being invertible with said floor to form skid members on the latter for packaging said trailer.

5. A buoyant, expansible vehicle trailer as set forth in claim 3 wherein telescopically disposed leg members are pivotally mounted on said second channel shaped frame for supporting the front end of said trailer when the front wheeled axle is removed.

JOHN H. STARK, Jr.

(References on following page)

REFERENCES CITED

The following references are of record in the file of this patent:

UNITED STATES PATENTS

| Number | Name | Date |
|---|---|---|
| 357,566 | Banks | Feb. 15, 1887 |
| 1,075,372 | Overshiner | Oct. 14, 1913 |
| 1,106,104 | Marx | Aug. 4, 1914 |
| 1,467,195 | Quackenbush | Sept. 4, 1923 |
| 2,080,709 | Hall et al. | May 18, 1937 |
| 2,346,130 | Evans | Apr. 11, 1944 |
| 2,382,376 | Black | Aug. 14, 1945 |
| 2,413,404 | Black | Dec. 31, 1946 |

FOREIGN PATENTS

| Number | Country | Date |
|---|---|---|
| 20,362 | Great Britain | Nov. 23, 1891 |
| 223,802 | Great Britain | Oct. 30, 1924 |
| 329,870 | Germany | Dec. 1, 1920 |
| 429,899 | Germany | June 5, 1926 |